United States Patent

[11] 3,558,832

[72] Inventors David R. Bonis; Harry M. Coumans; Wesley N. Willis, London, Ontario, Canada

[21] Appl. No. 731,763

[22] Filed May 24, 1968

[45] Patented Jan. 26, 1971

[73] Assignee Northern Electric Company Limited Montreal, Quebec, Canada

[54] TELEPHONE HOOK SWITCH
10 Claims, 10 Drawing Figs.

[52] U.S. Cl. .......... 179/159

[51] Int. Cl. .......... H04m 1/08

[50] Field of Search .......... 179/100, 100C, 100D, 103, 179, 158, 159, 169, 164

[56] References Cited

UNITED STATES PATENTS

| | | | |
|---|---|---|---|
| 3,027,432 | 3/1962 | Jordan et al. | 179/164 |
| 3,073,911 | 1/1963 | Mattke et al. | 179/179 |
| 3,396,244 | 8/1968 | Kowaleski | 179/100 |
| 3,440,366 | 4/1969 | Samios | 179/164 |

*Primary Examiner*—Kathleen H. Claffy
*Assistant Examiner*—Randall P. Myers
*Attorney*—Peter Kirby

ABSTRACT: The telephone handset in its hung-up condition operates an actuator assembly which is rotatably mounted in the telephone base and provided with contacting surfaces that cooperate with resilient contact leaves supported in a mounting block fixed to the base. A tension spring is arranged with its line of action close to the center of rotation of the actuator assembly to urge the assembly towards its projecting position, the force applied on the assembly being smaller in the depressed than in the projecting position. The contact leaves are so arranged that they engage the contacting surfaces in the projecting position and counteract the spring force.

TELEPHONE HOOK SWITCH

The present invention relates to a hook-switch combination for use in a telephone instrument.

The actuator assembly of such a hook-switch combination requires two stable positions, a depressed position in the hung-up condition of the telephone instrument and a projecting position in the online condition of the instrument. The depressed position is normally achieved by the weight of the handset engaging the actuator assembly, while a spring is provided to urge the actuator assembly into its projecting position when the handset is removed. Such spring necessarily counteracts the action of the weight of the handset in the depressed position. Both the projecting and the depressed positions of the actuator assembly must be firm and as insensitive as possible to external shocks experience by the telephone instrument. Such stability in the projecting position is normally achieved by providing sufficient pretensioning of the spring, while stability in the depressed position normally requires the weight of the handset engaging the actuator assembly to exceed the force exerted on the actuator assembly in its depressed position. In some instruments of the prior art, this force includes not only the counteracting force of the spring, which is usually greater in the depressed position than in the projecting position, due to the more stressed condition of the spring, but also the force of some spring contacts that are closed in this position, resulting in a considerable total force that has to be balanced to hold the hook switch in the depressed position, with a consequent need for a relatively heavy handset.

On the other hand, it is desirable to reduce the weight of the handset as much as possible. This, however, tends to reduce the stability of the hook-switch actuator assembly in the depressed position. The danger of insufficient depressing force is particularly serious in those cases in which the same telephone instrument is adapted to be used alternatively in a vertical or in a horizontal orientation, in which circumstances only a component of the weight of the handset will act to depress the actuator assembly in either orientation.

This danger is significantly reduced according to the present invention which provides a hook-switch combination comprising a base structure, an assembly fixed to the base structure for switching cooperation therewith, either or both of the fixed and actuator assemblies including contact for establishing the electrical circuits of the instrument, means mounting the actuator assembly movably on the fixed structure for operation by the handset for travel in a path between the projecting and the depressed positions, the contact means being located for switching the electrical circuits to the online condition over a first portion of the path of travel adjacent the projecting position and to the hung-up condition over a second portion of the path of travel adjacent the depressed position, and wherein the spring is connected between the base structure and the actuator assembly to urge this assembly from the depressed towards the projecting position and to exert a first force on the actuator assembly in its projecting position and a second force in its depressed position, the second force being the total force and substantially smaller than the first force to enable the actuator assembly to be maintained in the depressed position by light pressure from the handset, while providing firm actuation of the contact means in the projecting position.

In preferred embodiment, the contact means includes first and second contact means for engagement with each other in the online condition, at least one of the contact means being resilient so as to exert a third force on the actuator assembly when engaging the other contact means, the third force opposing the first force. Thanks to this arrangement, the force exerted by the contacts aids the actuator assembly to overcome the spring force, so that a correspondingly smaller force is required to be exerted by the weight of the handset.

Further features of the present invention will appear from the following specific description which is provided by way of example only.

Figure 6:
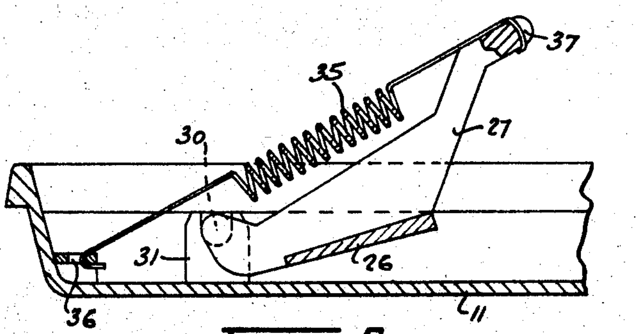
Figure 6A:
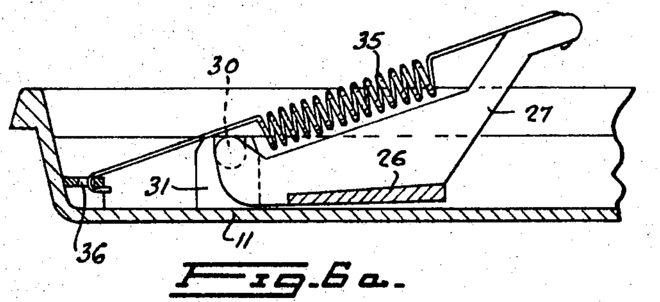
Figure 3:
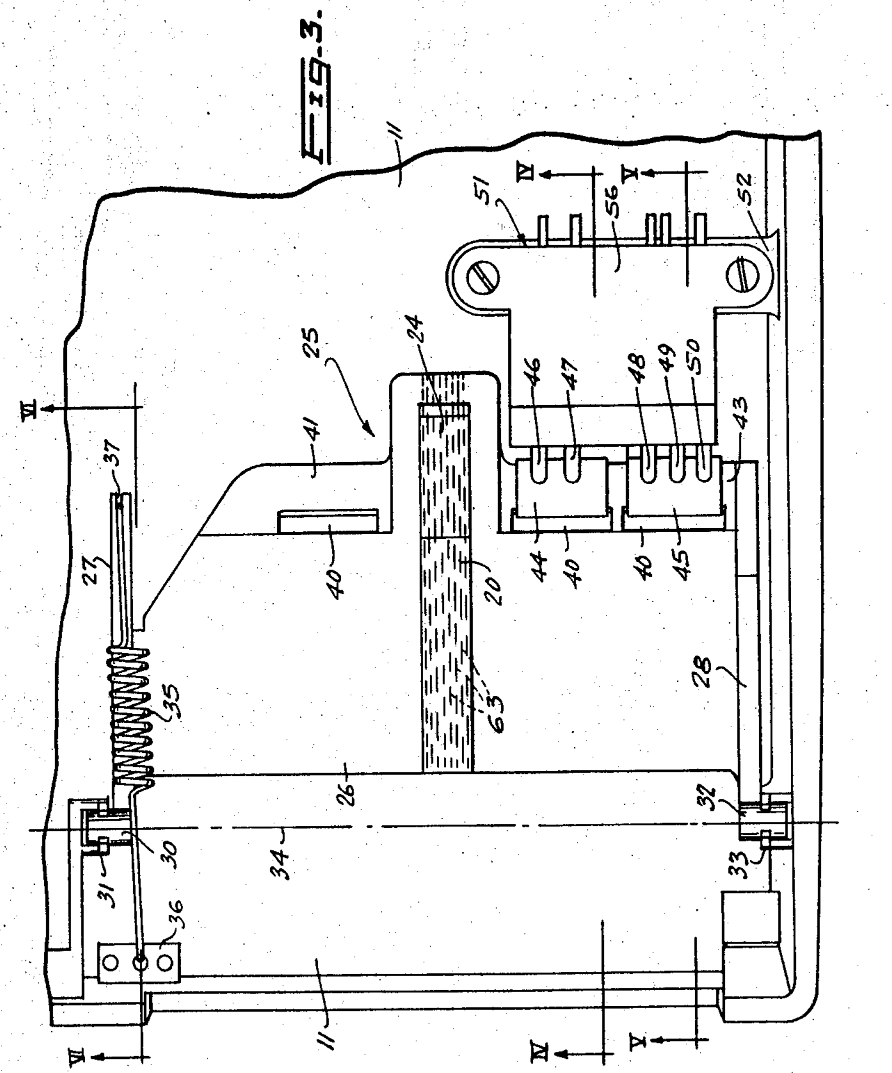
FIG. 3 is a partial plan view of the base of the housing structure of FIG. 1 with the cover of such base removed to show the mounting of the hook-switch.
Figures 4, 5, 5A, 5B:
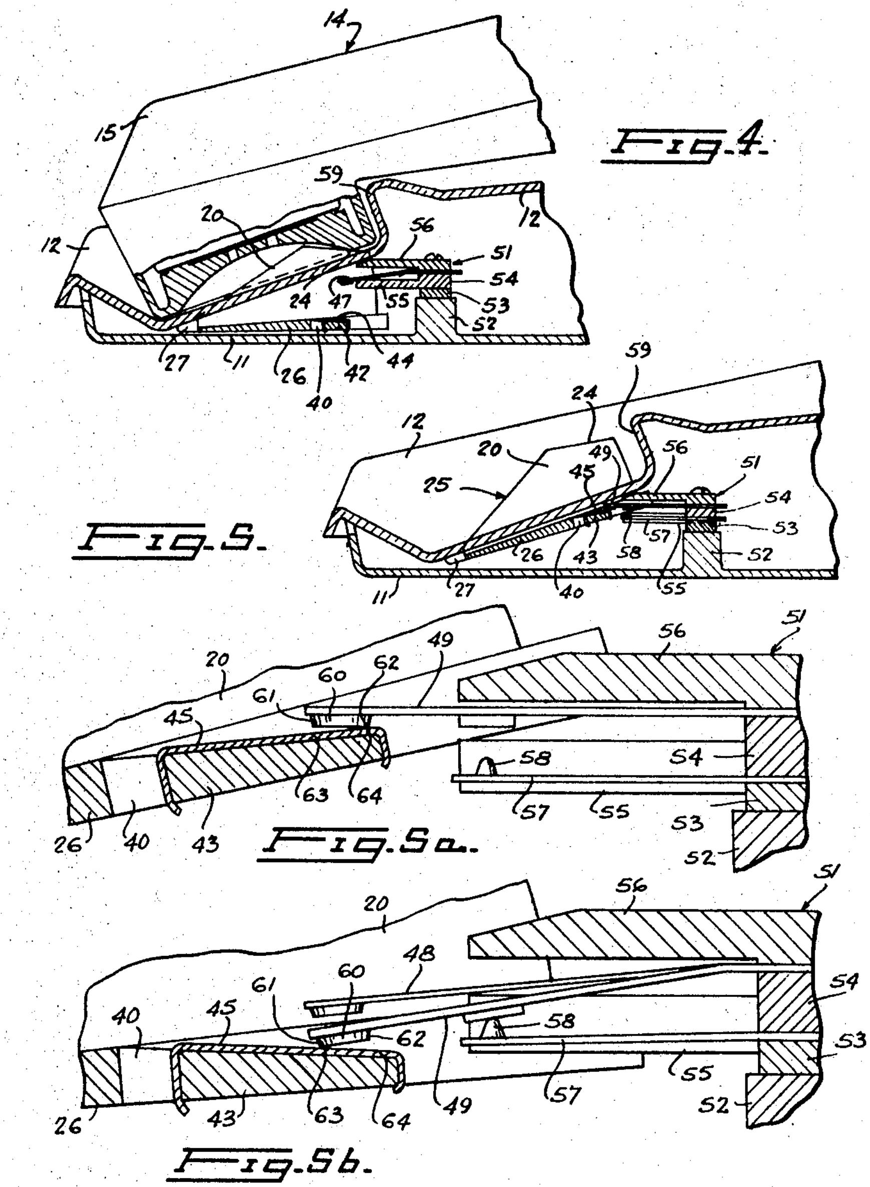
FIG. 4 is a cross section taken at the location of the line IV–IV in FIG. 3, but with the cover in position and the handset shown in its rest position.
FIG. 5 is a cross section similar to that of FIG. 4, but taken at the location of the line V–V in FIG. 3, but without the handset.
Figure 7:
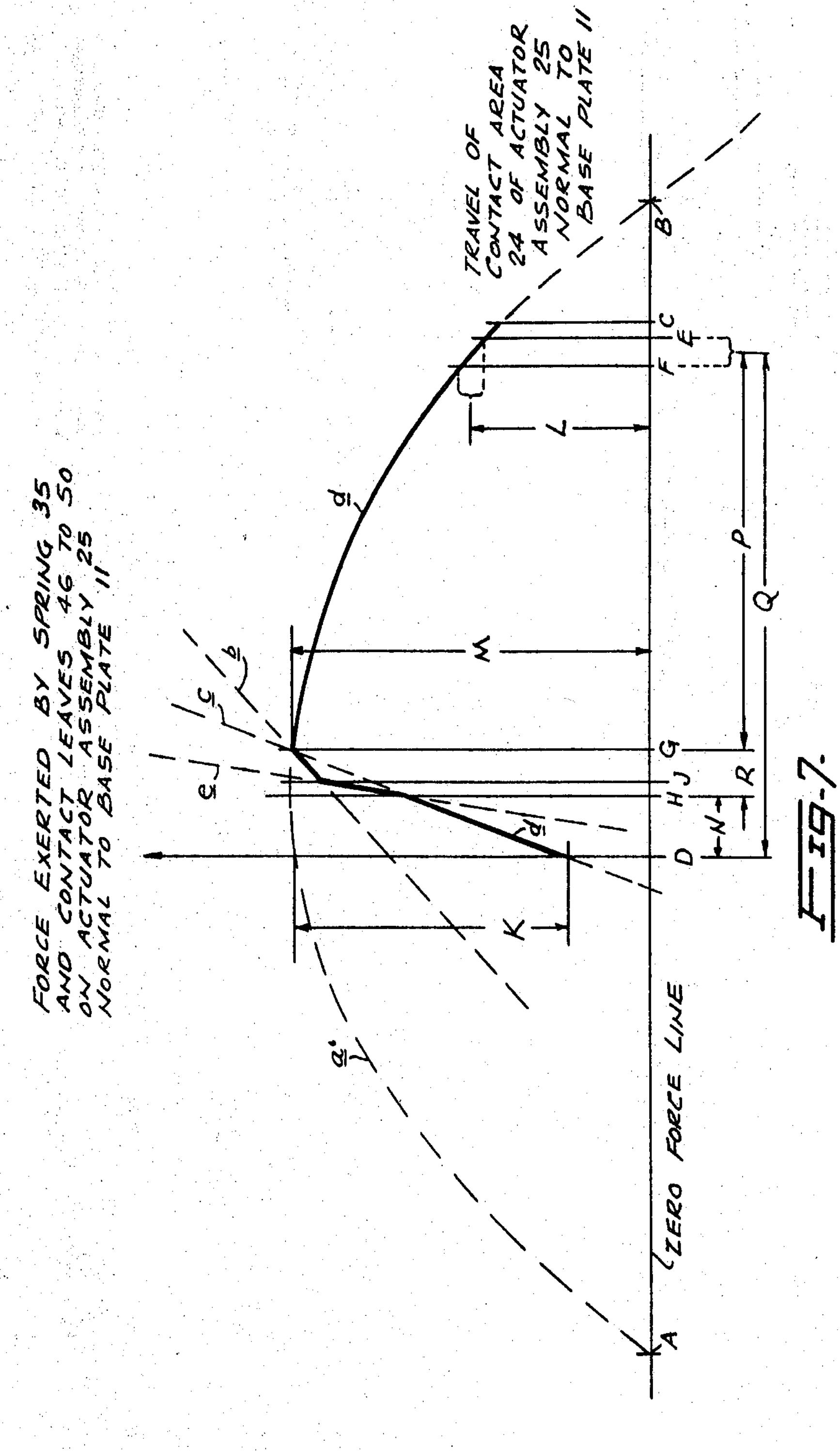

FIG. 5*a* shows a detail of FIG. 5 on an enlarged scale;

FIG. 5*b* shows the same detail as FIG. 5*a*,but in a different position;

FIG. 6 is a cross section taken along the line VI–VI in FIG. 3;

FIG. 6*a* is a view similar to FIG. 6 but showing the parts in a depressed position; and FIG. 7 is a graph of the force acting on the hook-switch actuator assembly plotted against its travel.

Figure 1:
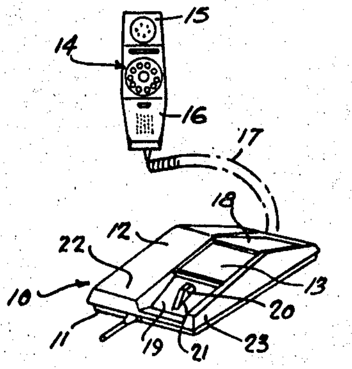
FIG. 1 is a perspective view of an apparatus constituting a telephone instrument housing structure, showing the apparatus in its horizontal position with the handset removed from the base.
Figure 2:
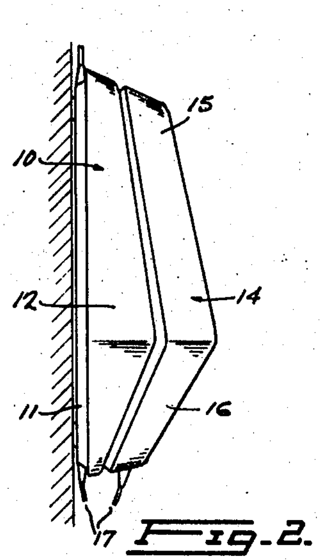
FIG. 2 is a side elevation of this apparatus in its vertical orientation in use as a wall instrument.

Referring to FIGS. 1 and 2, the telephone housing structure includes a base 10 comprising a base plate 11 and a cover 12 defining a socket 13. A handset 14 having a receiver portion 15 and a transmitter portion 16 is connected to the base 10 by a cord 17. When the handset 14 is in its rest position in the socket 13, the transmitter portion 16 of the handset 14 contacts a first socket surface 18 and the receiver portion 15 contacts a second socket surface 19 thereby depressing a fin-shaped actuator web 20 which extends through an elongated slot 21 provided in the second socket surface 19. The actuator web 20 forms part of a hook-switch actuator assembly 25 pivotally mounted in the base 10.

The apparatus is suitable without any changes to be used as a table instrument, e.g. in its horizontal orientation shown in FIG. 1, or as a wall instrument, e.g. in its vertical orientation shown in FIG. 2. The overall structure of this apparatus is disclosed in J. F. Tyson Canadian Pat. No. 815,122 issued Jun. 10, 1969 (U.S. Pat. application Ser. No. 627,372 filed Mar. 31, 1967), while a similar apparatus is disclosed in G.S. Laing et al. Canadian Pat. No. 841,129 issued May 5, 1970 (U.S. Pat. application Ser. No. 716,713 filed Mar. 28, 1968,now U.S. Pat. No. 3,546,397).

Referring now to FIGS. 3 to 6, the hook-switch actuator assembly identified generally by the reference numeral 25 comprises a transverse plate 26 and two lateral arms 27 and 28 connected to respective sides of the transverse plate 26. The web 20 is fixed to the transverse plate 26 approximately centrally between the two lateral arms 27 and 28. As seen in FIGS. 3 and 6, the rear end of the lateral arm 27 is provided with an outwardly extending pin 30 pivotally received in a bearing bracket 31 fixed to the base plate 11. A similar pin 32 is provided at the rear end of the other lateral arm 28 and is pivotally received another bearing bracket 33 also mounted on the base plate 11. The two pins 30 and 32 form a common axis 34 about which the actuator assembly 25 rotates, as the actuator web 20 is depressed. The entire actuator assembly 25, as described so far, forms a single piece and is made from an insulating material selected to provide high impact strength, low surface friction, transparency and ease of moulding, such as polycarbonate.

As shown in FIGS. 3 and 6, one end of a tension spring 35 is attached to a retaining lug 36 mounted on the base plate 11, while the other arm end of the tension spring 35 is retained in a groove 37 provided in the front end of the lateral arm 27. The action of the tension spring 35 is to rotate the actuator assembly 25 in a counterclockwise sense, as seen in FIG. 6, until the upper surface of the transverse plate 26 abuts the cover 12 beneath its socket surface 19 to bring the actuator assembly 25 to its projecting position shown in FIG. 5. In this position the spring 35 and the lateral arm 27 are above the level of the socket surface 19, but are displaced to the side therefrom and occupy a position under the portion 22 (FIG. 1) of the cover 12. At this time the lateral arm 28 can move up into the portion 23 of the cover 12. In the depressed position of the actuator assembly 25, shown in FIG. 4, the force of the tension spring 35 is overcome by the weight of the handset 14 bearing on the web 20.

The length of the spring 35 is so selected that a certain pretension exists in it in the projecting position shown in FIG. 6. As the actuator assembly 25 approaches its depressed position shown in FIGS. 4 and 6*a*, this tension is slightly increased by stretching of the spring, but at the same time the line of action of the spring moves nearer to the pivot axis 34 so that the force on the assembly 25 urging it towards its projecting position is decreased.

Close to the front end of the transverse plate 26, there are provided three slots 40 forming outer bridge portions 41, 42 and 43, respectively. Each of the bridge portions 42 and 43 is covered by a sheet of conducting metal, preferably gold, forming first and second contacting surfaces 44 and 45, respectively. Cooperating with the contact surfaces 44 and 45 to establish the electrical circuits of the telephone instrument are contact leaves 46 to 50 resiliently retained in a fixed assembly in the form of a mounting block 51 which consists of insulating material and is screwed onto a support 52 that forms part of the base plate 11.

As shown in FIGS. 4, 5, 5*a* and 5*b*,the mounting block 51 includes a lower portion 53, an intermediate portion 54 having an arm 55 projecting towards the actuator assembly 25, and an upper portion 56 extending over most of the length of the contact leaves 46 to 50 which are retained between the intermediate and the upper portions 54, 56. As shown indicated by the contact leaf 47 seen in FIG. 4, the contact leaves 46 to 48 are pretensioned against the arm 55 in the inoperative position of the actuator assembly 25. As indicated by the contact leaf 49 seen in FIG. 5*b*,the contact leaves 49 and 50 are also pretensioned so that, in the depressed position of the assembly 25, they each engage a respective additional contact leaf 57, only one of which leaves is seen in the drawings, and which contact leaves are retained between the intermediate portion 54 and the lower portion 53 of the mounting block 51.

As can be appreciated from FIG. 5*b*,the vertical distance between the upper surface of the arm 55 and the contact points 58 mounted on the ends of the contact leaves 57 allows for contact sequencing, i.e., as the actuator assembly 25 moves from its depressed position to its projecting position, engagement between the contact leaves 49, 50 and the contacting surface 45 occurs prior to the engagement between the contact leaves 46 to 48 and the contacting surfaces 44, 45. If desired, different levels may be formed in the upper surface of the arm 55 to provide further sequencing between the contact leaves 46 to 48.

As mentioned above, the contact leaves 46 to 50 are so pretensioned that they counteract the force of the tension spring 35 in the operative position of FIG. 5. As a result, the contact leaves 46 to 50 tend to depress the actuator assembly 25, thereby aiding the action of the weight of the handset 14, which, when placed in the socket 13, bears on a surface portion 24 of the web 20.

FIG. 7 is a graph of the various forces acting on the actuator assembly 25, plotted against the travel of the actuator assembly 25. In considering the forces acting on the actuator assembly, the force of gravity has been ignored, since it will be negligible in either orientation of the instrument. In this graph, curve *a* represents the force of the tension spring 35. This force equals zero in the fully contracted condition of the spring 35 (point A) which condition, of course, would only be reached if the cover 12 and the mounting block 51 with the contact leaves 46 to 50 were removed. Theoretically, there is a second condition (point B) in which the force of the tension spring 35 tending to lift the actuator assembly 25 off the base plate 11 becomes zero, namely the dead center condition in which the straight line connecting the two ends of the spring 35 intersects the axis 34. The actuator assembly 25 is, however, so shaped that it abuts the base plate 11 (point C) before such dead center condition is reached.

Point D in FIG. 7 indicates the location where the upper surface of the transverse plate 26 contacts the lower surface of the cover 12, as in FIG. 5. As will be appreciated, the cover 12 thus serves as a stop to prevent the actuator assembly 25 from further upward travel, thereby avoiding overbending the contact leaves 46 to 50. In the assembled instrument, points C and D in FIG. 7 represent the two limit positions (depressed and projecting) between which the actuator assembly 25 is free to travel. As shown in FIG. 4, a small space will remain between the lower surface of the transverse plate 26 and the upper surface of the base plate 11 when the actuator assembly 25 is depressed by the handset 14. This position is represented in FIG. 7 by the point E which is sufficiently close to the point C to be also considered as the depressed position. The rest position of the receiver portion 15 of the handset 14 in the socket 13 will be slightly different from that shown in FIG. 4, when the apparatus is used in its vertical orientation, under which condition the space between the transverse plate 26 and the base plate 11 will be slightly greater than that shown in FIG. 4. The corresponding position is represented in FIG. 7 by point F which is also considered as the depressed position.

At the end of the travel from the depressed to the projecting position, the contacting surfaces 44 and 45 of the assembly 25 engage the contact leaves 46 to 50 which, as stated above, counteract the force of the spring 35. Point G in FIG. 7 indicates the location where the contacting surface 45 first touches the contact leaves 49 and 50, (FIG. 5*b*), point H indicates the location where the contacting surfaces 44 and 45 first touch the remaining three contact leaves 46 to 48 and point J indicates the location at which the contact leaves 46 to 48 separate from the arm 55. The straight line *b* represents the combined force of the contact leaves 49 and 50, the straight line *c* represents the total force of all five contact leaves 46 to 50 and the straight line *e* represents the combined force of the contact leaves 49 and 50 and that of the contact leaves 46 to 48 shortened by their engagement with the arm 55.

The heavy line *d* shows the nature of the resultant force acting on the actuator assembly 25 between the two limit positions thereof, which resultant force is opposite to the external force required to transfer the assembly 25 from its projecting to its depressed position, and which has a maximum value M at point G, this value representing the maximum force that has to be applied to open the contacts. The force K represents the contact force between the five contacts 46 to 50 and the two contacting surfaces 44, 45, when the actuator assembly 25 is in the projecting position (point D). As stated above, in this position, the actuator assembly 25 abuts the cover 12. The force that is exerted on the actuator assembly 25 by the cover 12 essentially equals the difference between the maximum force M and the contact force K.

As an alternative, the dimensions of the cover 12 and the actuator assembly 25 and the strength of the contact leaves 46 to 50 may be such that the actuator assembly 25 never abuts the cover 12 unless intentionally pulled outwardly. In this case, the straight line *c* in FIG. 7 would intersect the zero force line at the right-hand side of the point D.

It will be noted that the average force L required to hold the actuator assembly 25 in one of its depressed positions (points E,F) is smaller than the contact force K and essentially smaller than the maximum force M. Such a relationship is desirable for the following reasons. For proper functioning of the telephone instrument in its online condition, a certain minimum contact force is necessary to hold the contacts together in the face of shock forces experienced by the instrument tending to displace of the actuator assembly 25 relatively to the contact leaves 46 to 50. On the other hand, as can readily be realized from FIG. 4, the external force depressing the actuator assembly 25 is that component of the weight of the handset 14 that acts on the surface portion 24 of the web 20 in a direction substantially normal to the base plate 11. This component will be smaller in the vertical orientation of the telephone instrument than in the horizontal orientation, being determined in the vertical orientation mainly by the inclination and the smoothness of the surface 59 of the cover 12 (FIG. 4). In the light of this fact and bearing in mind that it is desired to reduce the overall weight of the handset 14 as much as possible, it is important that the force L be significantly smaller than the maximum force M to ensure that the handset 14 holds the actuator assembly 25 in its depressed position. During the act of hanging up of the handset the greater force M will be readily overcome by the kinetic energy of the handset to which some manually applied forces may be added. At this time the possible occurrence of shocks can be ignored. The importance of the reduced force L is that it enables the handset to be light without sacrifice of reliability of contact holding.

As will be appreciated from the drawings, particularly from FIG. 5, the web 20 of the actuator assembly 25 is so shaped that the handset 14 cannot be rested on the surface 59 without transferring the actuator assembly to its hung-up condition.

As shown in FIG. 7, the average length Q of the path of travel of the actuator assembly 25 between its projecting position (point D) and one of its depressed positions (point E or F) is divided into a first portion N adjacent the projecting position, a second portion p adjacent the depressed position, and a third portion R in between the first and the second portions N and P. When the actuator assembly 25 is in the first portion N of its path of travel, all of the contact leaves 46 to 50 engage the corresponding contacting surfaces 44, 45, i.e. the electrical circuits of the telephone instrument are in their online condition. When the actuator assembly 25 is in the second portion P of its path of travel, all contacts are open, i.e., the electrical circuits are in their hung-up condition. Within the third portion R, only some of the contacts are closed.

It is a feature of the apparatus illustrated, that the major part, namely at least three quarters, of the total distance Q is occupied by the second portion P. Typical values are 0.5 inch for the total distance Q and 0.4 inch for the portion P. As a result, the handset 14 has a considerably amount of free movement within the hung-up condition of the instrument and, consequently, there is little danger of inadvertent contact operation due to minor displacements of the handset 14 within the socket 13 caused by shocks or resulting from the handset being improperly placed in the hung-up position.

FIG. 5a shows the contacting surface 45 engaging a contact stud 60 mounted on the end of the contact leaf 49 in the projecting position of the actuator assembly 25 (point D in FIG. 7), while FIG. 5b shows the same contacting parts 45, 49, with the actuator assembly 25 in a transitional position in which the contact is about to open (i.e. at point G in FIG. 7). It will be seen that, due to the shape of the contact stud 60 and the slope of the bridge portion 43, the operative contact in the projecting position of the actuator assembly 25 is established between a contact surface 62 situated at the inner end of the contact stud 60 and a corresponding contact surface 64 of the contacting surface 45, while the opening and closing of the contact stud 60 and a corresponding contact surface 63 of the contacting surface 45 spaced from the contact surface 64. This arrangement ensures that most of the contact wear and deterioration caused by sparks occurs at surfaces different from the operative contact surfaces 62, 64.

It is further pointed out, that some tangential relative movement between the contact stud 60 and the contacting surface 45 takes place within the first and third portions N, R (FIG. 7) of the path of travel of the actuator assembly 25. Similar tangential movement occurs between the contact studs attached to the remaining leaves within the portions N or N = R of the path of travel. This rubbing achieves a self cleaning action between the contacting parts.

As indicated in FIG. 3, the bottom surface of the transverse plate 26 is provided with longitudinal channels 63 underneath the actuating web 20. These channels 63 provide a substantially opaque layer at the bottom of the web 20 which projects through the cover 12, with the result that the base plate 11 cannot be seen through the slot 21, although the web 20 retains the transparent appearance that results from the clear material of which it is made.

It will have been noted, that the bridge portion 41 is not provided with a contacting surface cooperating with any contact leaves. Such additional contacts can, however, readily be added, should more complicated circuitry be required.

It is understood that the above described embodiment represents only an example of a manner in which the present invention can be carried into practice and that changes can be made without departing from the scope of the invention. Particularly, the resilient contact leaves may be attached to the movable actuation assembly and the nonresilient contacting surfaces may be attached to the fixed mounting block 51. It is also possible to arrange both contacting parts on either of the actuator assembly or on the mounting block. Instead of the rotational movement of the actuator assembly, a guided parallel displacement substantially normal to the base plate is possible.

We claim:

1. For use in a telephone instrument, a hook-switch combination comprising:

a. a base structure;

b. an assembly fixed to said base structure;

c. an actuator assembly for switching cooperation with said fixed assembly;

d. at least one of said assemblies including contact means for establishing the electrical circuits of said instrument;

e. means mounting said assemblies including contact means on said base structure for operation by a telephone handset for travel in a path between a projecting and a depressed position;

f. said contact means being located for switching said electrical circuits to and from an online condition over a first portion of said path of travel adjacent said projecting position and to and from a hung-up condition over a second portion of said path of travel adjacent said depressed position;

g. and spring means including means connecting said spring means between said base structure and said actuator assembly for urging said actuator assembly from said depressed position towards said projecting position;

h. said connecting means being positioned for causing said spring means to exert a first force on said actuator assembly in said projecting position and a second force on said actuator assembly in said depressed position; and i. said second force being the total force urging said actuator assembly from said depressed position towards said projecting position, and said second force being substantially smaller than said first force to enable said actuator assembly to be maintained in said depressed position by light pressure from the handset while providing firm actuation of said contact means in said projecting position.

2. The combination of claim 1, wherein said actuator assembly is free of said contact means over said second portion of said path of travel to ensure that said second force is said total free.

3. The combination of claim 1, wherein said first portion of the path of travel is a minor portion of said path of travel and is substantially shorter than said second portion thereof.

4. The combination of claim 3, wherein said first portion is at most a quarter of the path of travel.

5. The combination of claim 1, wherein said contact means includes first contact and second contact means for engagement with said first contact means in said online condition, one of said contact means being resilient so as to exert a third force on said actuator assembly when engaging the other contact means, said third force opposing said first force.

6. The combination of claim 1, wherein said actuator assembly includes means defining an axis of rotation, wherein said mounting means includes means mounting said actuator assembly for rotation about said axis in said path of travel, wherein said spring means includes a tension spring having a first and a second end, and wherein said connecting means includes means connecting said first end to said base structure at a location spaced from said axis in a first direction and means connecting said second end to said actuator assembly at a location spaced from said axis in a second direction, said first and second directions being substantially opposite to each other, but forming an angle smaller than 180°.

7. The combination of claim 5 wherein said first contact means is mounted on said fixed assembly and said second contact means is fixed to said actuator assembly, said mounting means including means guiding said actuator assembly to move at least partially tangentially to said fixed assembly over said first portion of said path of travel to effect rubbing between said first and second contact means.

8. The combination of claim 5, wherein said first contact means includes a first contact surface and a second contact surface spaced from said first contact surface, wherein said second contact means includes a third contact surface for engaging said first contact surface and a fourth contact surface for engaging said second contact surface, and wherein said mounting means includes means producing a change in the orientation of said first contact means relative to said second contact means during movement of said actuator assembly through said first portion of said path of travel to cause engagement between said first and third contact surfaces at the transition between said first and second portions of said path of travel and engagement between said second and fourth contact surfaces in said projecting position of said actuator assembly.

9. For use in a telephone instrument, a hook-switch combination comprising:

a. a base structure;
b. an assembly fixed to said base structure;
c. an actuator assembly for switching cooperating with said fixed assembly;
d. at least one of said assemblies including first contact means and second contact means for cooperation with said first contact means to establish the electrical circuits of said instrument;
e. means mounting said actuator assembly on said base structure for operation by a telephone handset for travel in a path between a projecting and a depressed position;
f. said first and second contact means being located for switching said electrical circuits to and from an online condition over a first portion of said path of travel adjacent said projecting position and to and from a hung-up condition over a second portion of said path of travel adjacent said depressed position;
g. spring means including means connecting said spring means between said base structure and said actuator assembly for urging said actuator assembly from said depressed position towards said projecting position;
h. said first contact means including a first contact surface and a second contact surface spaced from said first contact surface and said second contact means including a third contact surface for engaging said first contact surface and a fourth contact surface for engaging said second contact surface; and
i. said mounting means including means producing a change in the orientation of said first contact means relative to said second contact means during movement of said actuator assembly through said first portion of said path of travel to cause engagement between said first and third contact surfaces at the transition between said first and second portions of said path of travel and engagement between said second and fourth contact surfaces in said projecting position of said actuator assembly.

10. The combination of claim 9, wherein said first contact means is mounted on said fixed assembly and said second contact means is fixed to said actuator assembly, said mounting means including means guiding said actuator assembly to move at least partially tangentially to said fixed assembly over said first portion of said path of travel to effect rubbing between said first and second contact means.